(12) United States Patent
Tan et al.

(10) Patent No.: US 9,305,716 B2
(45) Date of Patent: Apr. 5, 2016

(54) RECHARGEABLE ELECTROCHEMICAL ENERGY STORAGE DEVICE

(75) Inventors: Bing Tan, Ann Arbor, MI (US); Zhendong Hu, Ann Arbor, MI (US); Yong Che, Ann Arbor, MI (US)

(73) Assignee: IMRA AMERICA, INC., Ann Arbor, MI (US)

( * ) Notice: Subject to any disclaimer, the term of this patent is extended or adjusted under 35 U.S.C. 154(b) by 912 days.

(21) Appl. No.: 12/960,002

(22) Filed: Dec. 3, 2010

(65) Prior Publication Data

US 2012/0140378 A1    Jun. 7, 2012

(51) Int. Cl.
*H01M 10/05* (2010.01)
*H01G 11/06* (2013.01)
*H01G 11/02* (2013.01)
(Continued)

(52) U.S. Cl.
CPC .............. *H01G 11/06* (2013.01); *H01G 11/02* (2013.01); *H01G 11/46* (2013.01); *H01G 11/54* (2013.01); *H01M 4/90* (2013.01); *H01M 12/08* (2013.01); *H01M 16/00* (2013.01); *H01M 16/003* (2013.01); *H01M 16/006* (2013.01); *Y02E 60/13* (2013.01); *Y02E 60/50* (2013.01); *Y02T 10/7022* (2013.01)

(58) Field of Classification Search
CPC ......... H01M 4/13; H01M 10/05; H01M 8/10; H01M 12/00; H01M 4/90; H01M 4/94; H01M 12/08; H01M 4/88; H01M 16/00; H01M 16/003; H01M 16/006; H01G 9/008; H01G 11/02; H01G 11/06; H01G 11/46; H01G 11/54; Y02E 60/13; Y02E 60/50; Y02T 10/7022

USPC ............... 429/405, 203, 331, 491, 44, 27, 42, 429/231.95, 104, 145, 304, 306, 218.1, 236, 429/249, 245, 465, 475, 529, 403; 361/500
See application file for complete search history.

(56) References Cited

U.S. PATENT DOCUMENTS 4,032,693 A    6/1977   Lindstrom
4,957,826 A    9/1990   Cheiky
(Continued)

FOREIGN PATENT DOCUMENTS

EP    1 796 200 A1    6/2007
JP    2005-166685 A   6/2005
WO    2010/100636 A1  9/2010

OTHER PUBLICATIONS

Toshiro Hirai, et al., "Effect of method of preparation of FePc oxygen reduction catalyst on the activity of practical air electrodes", Journal of Applied Electrochemistry, 1985, pp. 77-84, vol. 15.
(Continued)

*Primary Examiner* — Raymond Alejandro
*Assistant Examiner* — Ling R Zeng
(74) *Attorney, Agent, or Firm* — Sughrue Mion, PLLC; Richard C. Turner

(57) ABSTRACT

A rechargeable energy storage device is disclosed. In at least one embodiment the energy storage device includes an air electrode providing an electrochemical process comprising reduction and evolution of oxygen and a capacitive electrode enables an electrode process consisting of non-faradic reactions based on ion absorption/desorption and/or faradic reactions. This rechargeable energy storage device is a hybrid system of fuel cells and ultracapacitors, pseudocapacitors, and/or secondary batteries.

26 Claims, 7 Drawing Sheets

(51) Int. Cl.
H01G 11/46 (2013.01)
H01G 11/54 (2013.01)
H01M 4/90 (2006.01)
H01M 12/08 (2006.01)
H01M 16/00 (2006.01)

(56) References Cited

U.S. PATENT DOCUMENTS

| | | | |
|---|---|---|---|
| 4,985,317 | A | 1/1991 | Adachi |
| 5,306,579 | A | 4/1994 | Shepard, Jr. et al. |
| 5,639,568 | A | 6/1997 | Pedicini et al. |
| 2004/0137310 | A1 | 7/2004 | Kiros |
| 2004/0170555 | A1 | 9/2004 | Van Heuveln |
| 2004/0241537 | A1 | 12/2004 | Okuyama et al. |
| 2006/0134515 | A1 | 6/2006 | Kumashiro |
| 2006/0257744 | A1 | 11/2006 | Burchardt |
| 2007/0117007 | A1 | 5/2007 | Visco et al. |
| 2007/0154766 | A1* | 7/2007 | Baik et al. ............... 429/34 |
| 2007/0166602 | A1* | 7/2007 | Burchardt ................ 429/44 |
| 2007/0172739 | A1* | 7/2007 | Visco et al. ............. 429/322 |
| 2008/0292963 | A1* | 11/2008 | Sato et al. ............... 429/218.1 |
| 2009/0305135 | A1 | 12/2009 | Shi et al. |
| 2010/0126849 | A1 | 5/2010 | Lopatin |
| 2010/0151336 | A1* | 6/2010 | Nakanishi ............... 429/407 |

OTHER PUBLICATIONS

Abraham, K.M., "A Brief History of Non-aqueous Metal-Air Batteries," ECS Transactions, 2008, pp. 67-71, vol. 3, No. 42.

Bullis, Kevin, "High-Energy Batteries Coming to Market," IE School of Arts and Humanities, Oct. 28, 2009.

Chang, Yun-Min, et al., "Synthesis of $La_{0.6}Ca_{0.4}Co_{0.8}Ir_{0.2}O_3$ perovskite for bi-functional catalysis in an alkaline electrolyte," Journal of Power Sources, 2009, pp. 1003-1007, vol. 189.

Dong, Hanwu, et al., "An air-metal hydride battery using $MmNi_{3.6}Mn_{0.4}Al_{0.3}Co_{0.7}$ in the anode and a perovskite in the cathode," International Journal of Hydrogen Energy, 2010, pp. 4336-4341, vol. 35.

Dražić, D.M., et al., "Transition metal catalysts for porous carbon air-electrodes in neutral chloride electrolytes," Journal of Applied Electrochemistry, 1983, pp. 337-340, vol. 13.

Gamburzev, S., et al., "Development of a novel metal hydride-air secondary battery," Journal of Applied Electrochemistry, 1998, pp. 545-549, vol. 28.

Hyodo, T., et al., "Prasceodymium-calcium manganites $(Pr_{1-x}Ca_xMnO_3)$ as electrode catalyst for oxygen reduction in alkaline solution," Journal of Applied Electrochemistry, 1997, pp. 745-746, vol. 27.

Katsaounis, A., "Recent developments and trends in the electrochemical promotion of catalysis (EPOC)," 2010, pp. 885-902, vol. 40.

Neburchilov, Vladimir, et al., "A review on air cathodes for zinc-air fuel cells," Journal of Power Sources, 2010, pp. 1271-1291, vol. 195.

Osada, N., et al., "Cycling Performance of a Metal Hydride-Air Rechargeable Battery,"$218^{th}$ ECS Meeting, 2010, The Electrochemical Society, Abstract 194.

Tarasevich, M.R., et al., "Development of platinum-free catalyst and catalyst with low platinum content for cathodic oxygen reduction in acidic electrolytes," Journal of Applied Electrochemistry, 2007, pp. 1503-1513, vol. 37.

Thangadurai, V., et al., "Solid State Lithium Ion Conductors: Design Consideration by Thermodynamic Approach," Ionics, 2002, pp. 281-292, vol. 8.

Tsuchinaga, Y., et al., "Improvement in Energy Density of Metal Hydride-Air Secondary Batteries," Department of Science of Environment Systems Science.

Yuasa, Masayoshi et al., "Structural optimization of gas diffusion electrodes loaded with $LaMnO_3$ electrocatalysts," Journal of Applied Electrochemistry, 2010, pp. 675-681, vol. 40.

Zheng, Jim P., "The Limitations of Energy Density of Battery/Double-Layer Capacitor Asymmetric Cells," Journal of the Electrochemical Society, 2003, pp. A484-A492, vol. 150, No. 4.

T. Hirai et al., "Effect of Method of Preparation of FePc Oxygen Reduction Catalyst on the Activity of Practical Air Electrodes", J. Applied Electrochemistry 15, 1985, pp. 77-84.

English translation of Japanese Office Action issued Nov. 4, 2015 by the Japanese Patent Office in counterpart Japanese Application No. JP 2013-541993.

* cited by examiner

Charge  Positive electrode: $4OH^- \rightarrow O_2 + 2H_2O + 4e^-$
Negative electrode: $C + K^+ + e^- \rightarrow C^-//K^+$
Overall: $4C + 4OH^- + 4K^+ \rightarrow 4C^-//K^+ + O_2 + 2H_2O$ Discharge  Positive electrode: $O_2 + 2H_2O + 4e^- \rightarrow 4OH^-$
Negative electrode: $C^-//K^+ \rightarrow C + K^+ + e^-$
Overall: $4C^-//K^+ + O_2 + 2H_2O \rightarrow 4C + 4OH^- + 4K^+$ Charge  Positive electrode: $2H_2O \rightarrow O_2 + 4H^+ + 4e^-$
Negative electrode: $C + H^+ + e^- \rightarrow C^{\cdot}// H^+$
Overall: $4\,C + 2\,H_2O \rightarrow 4\,C^{\cdot}//H^+ + O_2$ Discharge  Positive electrode: $O_2 + 4H^+ + 4e^- \rightarrow 2H_2O$
Negative electrode: $C^{\cdot}// H^+ \rightarrow C + H^+ + e^-$
Overall: $4\,C^{\cdot}//H^+ + O_2 \rightarrow 4\,C + 2\,H_2O$ Charge   Positive electrode: $2H_2O \rightarrow O_2 + 4H^+ + 4e^-$
Negative electrode: $C + Na^+ + e^- \rightarrow C^-// Na^+$
Overall: $4 C + 2 H_2O + 4 Na^+ \rightarrow 4 C^-//Na^+ + 4 H^+$ Discharge   Positive electrode: $O_2 + 4H^+ + 4e^- \rightarrow 2H_2O$
Negative electrode: $C^-// Na^+ \rightarrow C + Na^+ + e^-$
Overall: $4 C^-//Na^+ + 4 H^+ + O_2 \rightarrow 4 C + 2 H_2O + 4 Na^+$ Charge
Positive electrode: $2Li_2O \rightarrow O_2 + 4Li^+ + 4e^-$
Negative electrode: $C + Li^+ + e^- \rightarrow C\cdot // Li^+$
Overall: $4C + 2L_2O \rightarrow 4C\cdot //Li^+ + O_2$ Discharge
Positive electrode: $O_2 + 4Li^+ + 4e^- \rightarrow 2Li_2O$
Negative electrode: $C\cdot // Li^+ \rightarrow C + Li^+ + e^-$
Overall: $4C\cdot //Li^+ + O_2 \rightarrow 4C + 2L_2O$ Charge  Positive electrode: $C + PF_6^- \rightarrow C^+//PF_6^- + e^-$
Negative electrode: $4Na^+ + O_2 + 4e^- \rightarrow 2Na_2O$
Overall: $4C + 4PF_6^- + 4Na^+ + O_2 \rightarrow 4C^+//PF_6^- + 2Na_2O$ Discharge  Positive electrode: $C^+//PF_6^- + e^- \rightarrow C + PF_6^-$
Negative electrode: $2Na_2O \rightarrow 4Na^+ + O_2 + 4e^-$
Overall: $4C^+//PF_6^- + 2Na_2O \rightarrow 4C + 4PF_6^- + 4Na^+ + O_2$

RECHARGEABLE ELECTROCHEMICAL ENERGY STORAGE DEVICE

FIELD OF INVENTION

This invention relates to energy storage devices. More specifically, the present invention relates to a type of rechargeable energy storage devices that have both air electrodes and capacitive electrodes for energy storage.

BACKGROUND OF INVENTION

Batteries and capacitors represent two most important systems for energy storage, with applications in electronics, electric vehicles, telephone communication systems, power supplies, and many other applications.

A battery is used to store electricity by converting electric energy into chemical energy during charging and converting chemical energy back into electric energy during discharging. The energy is stored through chemical reactions, which are often associated with the change of oxidation states of active metal species (faradic reactions). Electro-active materials are often the active component in batteries since they can provide redox reactions for energy storage. Because of the high theoretical energy storage capacities, metals have been pursued as the negative electrode materials for high energy batteries. Batteries based on metals, however, generally have poor cycling stabilities during the charge/discharge process. The instability normally comes from the irreversible metal dissolution/deposition process. Metals may dissolve into metal ions during the discharge process in those batteries. For example, in a zinc-nickel oxide battery, metallic zinc dissolves as zinc ions during discharging and deposit back as metallic zinc from zinc ions during charging. This dissolution/deposition process is not repeatable as zinc tends to form dendrites in solution instead of depositing back onto the current collector as the original metallic film. Similar problems have been encountered in lithium batteries, where the metallic lithium dissolves as lithium ions during discharging and the lithium ions deposit as metallic lithium during charging. Capacitive materials will be more stable if they can maintain their solid morphology during the charge/discharge process. For example, in lithium ion batteries, metals such as tin may form alloys with lithium ions during charging and the alloys release lithium ions back into the electrolyte during discharging. During the charge/discharge cycling process, the non-lithium metals experience volume expansion/contraction because the insertion/extraction of lithium ions. However, since the solid morphologies are maintained for these metals, the cycling stability has been greatly improved for tin-based lithium ion batteries as compared to lithium batteries. The typical charge/discharge cycling number is only at most tens of cycles for metallic lithium-based batteries, while the typical cycling number for lithium ion batteries with tin negative electrodes can be hundreds of cycles. These non-dissolving electro-active materials, however, may still have limited charge/discharge cycling stability mainly because of the volume change associated with the faradic reactions. The lithium ion insertion and extraction processes will cause the volume of the non-dissolving electro-active material to expand and to contract, which will disrupt the original compact structure of the electrode film resulting in the loss of electric connections among the electro-active particles, which in turn results in the fading of capacity during the charge/discharge cycling. Unlike the dissolution/deposition process, instability from the volume expansion/contraction process can be limited by controlling the material architecture in the electrode. For example, the stability can be improved greatly by coating the electro-active material onto a stable carbonaceous material, so that the electric connections to the electro-active material can be maintained during the volume expansion/contraction process.

As another type of energy storage devices, electrochemical capacitors store electric energy mainly through the highly reversible electric static interactions (double-layer adsorption/desorption or non-faradic reactions). Since there is negligible physical state change of the electrode material during the charge/discharge process, an electrochemical capacitor can have excellent cycling stability up to 20,000,000 cycles. Electrochemical capacitors, however, are limited in energy densities. In a capacitor, the amount of charge that can be stored is directly proportional to the available electrode/electrolyte interfaces for ions adsorption/desorption. The maximum energy density that can be stored therefore is limited by the surface area of the electrode material. The energy density can be improved by using an asymmetric structure, where one electrode consists of an electro-inert porous carbonaceous material and the other electrode consists of an electro-active material. The incorporation of an electro-active material can greatly increase the energy density of the device by using less total electrode materials since the electro-active material can have at least several times larger capacity than an electro-inert material. A capacitor's capacitance can be calculated as $1/(m_T C_T) = 1/(m_n C_n) + 1/(m_p C_p)$, where $C_T$ is the device's specific capacitance, $C_n$ is the specific capacitance for the negative electrode, $C_p$ is the specific capacitance for the positive electrode, $m_T$ is the total weight of the two electrode materials, $m_n$ is the weight for negative electrode weight, and $m_p$ is the weight for positive electrode weight. For a symmetric double-layer capacitor, $C_n$ equals $C_p$. To maximize the value of $C_T$, it is necessary to make $m_n C_n$ and $m_p C_p$ to be the same value resulting in a mass ratio of 1 of $m_n/m_p$. $C_T$ therefore is ¼ of $C_n$ or $C_p$. In an asymmetric capacitor, if $C_p$ (electro-active material) is far larger than $C_n$ (porous carbon), $m_p$ could be much smaller than $m_n$. $m_T$ therefore will be close to the weight of $m_n$ yielding a much larger value of $C_T$. J. P. Zheng calculated the theoretical limitation of energy densities for the two systems. The maximum energy density is 7.16 Wh/kg for an activated carbon/activated carbon symmetric capacitor, while the value reaches 50.35 Wh/kg for an activated carbon/$Ni(OH)_2$ asymmetric capacitor with aqueous electrolyte. Regardless of the advantage of electro-active materials, charge capacities of these materials, however, are still limited (for example theoretical capacity for NiOOH is 292 mAh/g). Higher energy density can be expected if the positive electrode can store much more energy so that the electrode weight can be further reduced.

As a hybrid system of batteries and fuel cells, metal-air batteries have been a focus as the energy storage devices with high energy densities. In this system, a pure metal such as lithium and zinc is used as fuel to generate electrons as the negative electrode. Oxygen from air is used as the oxidant at the positive electrode side. During discharging, the metal is oxidized at the negative electrode, while oxygen is reduced by a catalyst at the positive electrode (air electrode). During charging, the oxidized metal ions are reduced into metal particles, while oxygen is generated by using an oxygen evolution catalyst at the positive electrode. Since oxygen can be fed from air, the theoretical energy capacity at the air electrode is unlimited large. The theoretical energy density of this system is determined by the energy capacity of the metal and the operating voltage window.

This system, however, is generally limited by its poor charge/discharge cycling stability, which is mainly caused by the instability of the negative electrode during cycling. The prior art air batteries have been limited into either using metals as negative electrode materials in aqueous alkaline electrolyte or metallic lithium as the negative electrode material in organic electrolyte except in very few cases where silicon and metal hydrides were used as the negative electrode materials in aqueous alkaline electrolyte and carbonaceous materials and metals were used as the negative intercalation materials in organic electrolyte. The cause of the instability varies depending on the electrolyte system and the negative electrode material. For zinc-air, sodium-air, magnesium-air, and lithium-air batteries, the instability is mainly because of the metal dissolution/deposition process during the charge/discharge cycling process. In U.S. Patent Application, Pub. No. 2006/0257744 A1, Burchardt disclosed the formulation of a zinc electrode for electrochemically rechargeable zinc-air alkaline batteries. The stability is still limited to tens of cycles because of the stability limitation in zinc electrode. In U.S. Patent Application, Pub. No 2007/0117007 A1, rechargeable lithium-air batteries were fabricated by depositing a lithium-ion conductive solid coating on metallic lithium to limit the corrosion of lithium by moisture and electrolyte. This coating, however, is not expected to solve the stability issues because of the dramatic volume change of the lithium film during the lithium dissolution/deposition process. In Patent Publication, Pub. No. WO/2010100636, Yair disclosed the use of a silicon negative electrode in an alkaline system as a primary air battery. The formed silicate ions are almost impossible to be reduced back into silicon. Osada et al. disclosed the use of metal hydrides as the negative electrode materials in the 218$^{th}$ Electrochemical Society Meeting and a promising cycling stability was reported. The cycling stability of metal hydrides, however, is limited to at most 1500 cycles as in nickel metal hydride alkaline batteries. In U.S. Patent Application, Pub. No. 2004/0241537 A1, Okuyama et al. revealed the fabrication of an air battery with carbonaceous materials and metals as the negative electrode material in an organic electrolyte. These negative materials stored energy through a lithium ion intercalation process (faradic reactions) as being described in the patent. For carbonaceous materials and metals to be used to as intercalation materials, the negative electrode has to be charged/discharged to very low voltage potentials (generally <0.3 V vs. Li/Li$^+$), which may limit the long-term stability and cause safety issues. Carbonaceous materials generally act as electro-inert materials in aqueous solution, but they can become electro-active when they are charged/discharged to very low potentials in organic electrolyte (generally <0.3 V vs. Li/Li$^+$). An electro-active carbonaceous material will experience volume expansion/contraction as other negative electrode materials, which limits its cycling stability from tens to a few thousands of cycles. In comparison, an electro-inert carbonaceous material may be cycled for millions of cycles. Moreover, electro-active carbonaceous materials may be limited in energy capacities. The theoretical energy capacity for graphite is 374 mAh/g. In comparison, the theoretical energy capacity for silicon is 4200 mAh/g. On the other hand, non-lithium metals can form alloys with lithium. These metals will experience dramatic volume expansion/contraction during charge/discharge cycling. For example, the volume expansion for tin is 676% when it is fully charged in a lithium ion battery. A battery with a pure metal negative electrode will have limited cycling stability because of the volume expansion/contraction. In this sense, prior art negative materials for non-aqueous air batteries are limited either in specific capacity (carbons, 374 mAh/g or 834 mAh/cm$^3$ for graphite) or in cycling stability (lithium and metals). It would be necessary to develop a negative material that provides both high capacity and good cycling stability for air batteries.

The instability of the metal electrode has limited metal-air batteries to mainly primary (non-rechargeable) batteries unless the metal is mechanically refueled, which is similar to the operation concept with a liquid or gaseous fuel. Besides being limited in the negative electrode materials, the prior art metal-air batteries have several other limitations. The prior art metal-air batteries are limited in using air electrode as the positive electrode, while the possibility of using air electrode as the negative electrode has not been disclosed. The prior art aqueous metal-air batteries are limited in using a highly corrosive alkaline solution as the electrolyte, while the possibility of using a mild neutral solution or an acidic solution has not been disclosed.

SUMMARY OF THE INVENTION

A general object of this invention, therefore, is to provide electrochemically rechargeable energy storage devices with good stability based on various combinations of air electrodes, electro-inert materials, electro-active materials, and electrolytes.

Various embodiments relate to new rechargeable energy storage devices based on the operating concepts from electrochemical capacitors, batteries and fuel cells.

In at least one embodiment, a hybrid device comprises a capacitive electrode with the similar function as in an electrochemical capacitor and a second electrode with the same function as an air electrode from rechargeable metal-air batteries. One electrode may include a capacitive material that stores energy through non-faradic reactions and the other electrode may include a material that acts as a catalyst or catalysts for both oxygen reduction and evolution. This energy storage device is expected to have improved energy density over symmetric double layer capacitors by greatly reducing or nearly eliminating the weight of the air electrode. For example, the energy density of an electrochemical capacitor can be calculated as $1/(m_T C_T)=1/(m_n C_n)+1/(m_p C_p)$ as we discussed above. With an efficient catalyst, the theoretical capacitance for the air electrode is unlimited large. Therefore, the weight for the air electrode can be negligible small compared to the material weight at the negative electrode. The specific capacitance of the device will be the same as the specific capacitance of the negative electrode. For an activated carbon with 280 F/g capacity, the total capacitance of a capacitor with air electrode is 280 F/g, while the value is 70 F/g for the corresponding symmetric activated carbon/activated carbon capacitor.

In at least one embodiment, a hybrid device comprises a capacitive electrode with the similar function as in an electrochemical capacitor/battery and a second electrode with the same function as an air electrode from rechargeable metal-air batteries. The hybrid energy storage device will have improved cycling stability and/or improved energy density over the prior art metal-air batteries by using wisely choosed negative electrode materials such as electro-inert carbonaceous materials, electro-active silicon/carbon composites, and electro-active compounds. In one example, the cycling stability of zinc-air batteries will be improved if zinc is replaced by a carbonaceous material since the carbonaceous material can reversibly store energy through non-faradic reactions. In another example, the metallic lithium negative electrode may be replaced with a silicon/carbon composite in non-aqueous lithium-air batteries. The cycling stability of the composite negative electrode could be much better than pure lithium as being proved in lithium-ion batteries research. Silicon tends to form alloys with lithium ions during the charge process and release lithium ions during the discharge process. Unlike lithium, silicon maintains its solid morphology during the cycling process. By constraining the volume change (as high as 400%) with carbon, at least a few hundred charge/discharge cycles have been obtained for a silicon/carbon composite electrode in a non-aqueous electrolyte. Compared to prior art electro-active carbonaceous material as the negative material, a silicon/carbon composite could provide much higher energy density (theoretical specific capacity for silicon: 4200 mAh/g) while maintaining a comparable cycling stability. In a third example, a compound such as $Li_4Ti_5O_{12}$ could be used as the negative electrode material. The volume expansion/contraction during the lithium insertion/extraction process is negligible for $Li_4Ti_5O_{12}$. A hybrid device built on $Li_4Ti_5O_{12}$ will have improved cycling stability over the prior art metal-air batteries.

In at least one embodiment, the air electrode could be used as the negative electrode instead of using as a positive electrode as in the prior art air batteries. The application of air electrode as the negative electrode may provide us a safe rechargeable energy storage device with good energy density. Current safe lithium-ion batteries focus on using $Li_4Ti_5O_{12}$ as the negative electrode material because of its relatively high redox potential (~1.5 V vs. $Li/Li^+$) and negligible volume expansion/contraction during cycling. The theoretical energy density of this negative material, however, is only 175 mAh/g, which limits the overall energy density of an energy storage device. The device's energy density could be doubled with an air electrode operated at similar redox potentials by assuming the positive electrode has a capacity of 175 mAh/g.

In at least one embodiment, the electrolyte could be neutral solution. The prior art aqueous metal-air batteries are limited in using highly alkaline electrolytes. The high corrosive properties of highly alkaline solutions may limit the cycling stability of an air catalyst. A mild neutral electrolyte may extend the stability of the air catalyst. Moreover, the operating voltage window of the device may be extended since the potentials of oxygen reduction/evolution are expected to be positively shifted because of a decrease in pH while the operating potential of the negative electrode could be maintained at similar range because of the overpotential formed at the negative electrode.

DETAILED DESCRIPTION OF THE PREFERRED EMBODIMENTS

In various embodiments an asymmetric rechargeable energy storage device utilizes a capacitive material or materials as one electrode for charge storage and an air electrode or electrodes as the other electrode or electrodes for oxygen reduction and evolution. By definition, the air electrode comprises catalyst/catalysts for both oxygen reduction reaction (ORR) and oxygen evolution reaction (OER). The air electrode may be two catalytic reactive electrodes that can catalyze the ORR and OER separately. Based on the operational concept, the invented asymmetric rechargeable energy storage device may have a variety of designs and a variety of combinations of electrodes and electrolytes.

Figure 1:
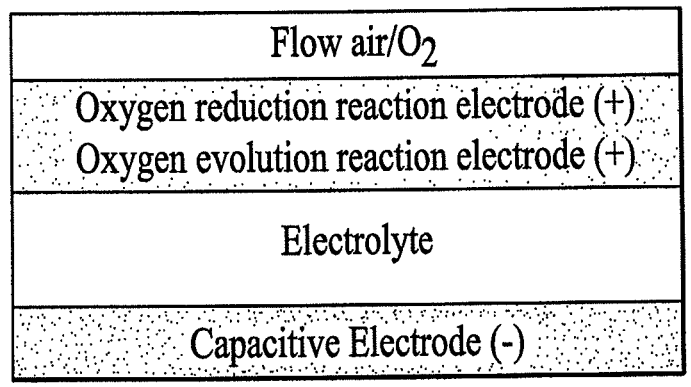
FIG. 1 is a schematic representation of a two-electrode asymmetric rechargeable energy storage device.

An example of a general structure of two-electrode device is illustrated in FIG. 1. The asymmetric rechargeable device may comprise a positive electrode consisting of a current collector and a catalyst or catalysts that can effectively reduce oxygen during the discharge process and facilitate oxygen evolution during the charge process, a negative electrode consisting of a porous material or materials that can store charge at the electrode/electrolyte interface, a porous electric insulating separator that allows ion but not electron transport, an electrolyte that includes aqueous and non-aqueous solutions, gels, polymers, semi-solids, and solids.

Figure 2:
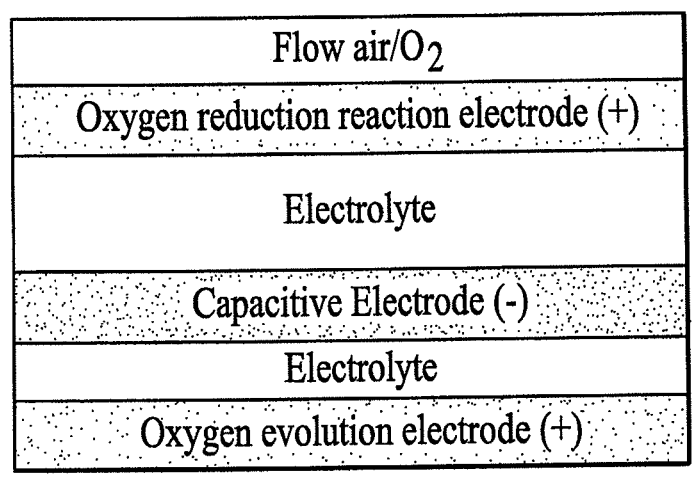
FIG. 2 is a schematic representation of a three-electrode asymmetric rechargeable energy storage device.

The energy storage device may be designed as a three-electrode device (FIG. 2) to improve the device's stability. The three-electrode device may comprise two separate catalytic electrodes for the oxygen reduction reaction (ORR) and the oxygen evolution reaction (OER). The capacitive electrode may be located between the oxygen reduction catalytic electrode and the oxygen evolution catalytic electrode. The ORR electrode is electrically isolated during the charging process, so that this electrode is not affected by the high oxygen evolution potential applied to the OER electrode, which may extend the lifetime of the ORR electrode.

In an asymmetric rechargeable device, current collectors may be made from conductive carbonaceous materials, non-reactive metals, or other electric conductive substances that are stable in contact with the electrolyte in the range of working voltages. Unlike capacitors, structures of the two electrodes in the device are different from each other. One electrode contains a capacitive material, which is similar to a capacitor or a battery. Basically, a film made of a capacitance-active material is coated or deposited on top of the current collector. The film may comprise a capacitive material for energy storage, a conductive additive to improve the film's electric conductivity, and a polymer binder to help maintain the integral structure of the film. An example of a capacitive material for the rechargeable device may comprise both an electro-inert material and an electro-active material. The electro-inert material will provide long cycling stability, while the electro-active material will provide high energy storage capacity. The ratio between two components may vary depending on the performance requirement for the device. Generally, a higher ratio of electro-inert material/electro-active material will be used for devices with longer cycling stability, while a higher ratio of electro-active material/electro-inert material will be used for devices with higher energy density. Depending on the device performance requirement, the ratio of electro-inert material/electro-active material can be at least about 5%, at least about 20%, at least about 50%, and at least about 90%. A second example of a capacitive material for the rechargeable device may comprise only an electro-inert material to provide long cycling stability for certain applications. A third example of a capacitive material for the rechargeable device may comprise only an electro-active material that is superior to the prior art materials in either cycling stability or specific energy capacity. In one example, a silicon/carbon composite may be used as the capacitive material in an organic electrolyte to provide good cycling stability and large energy capacity. In another example, $Li_4Ti_5O_{12}$ may be used as the capacitive material to provide long cycling stability. In a third example, $LiCoO_2$ may be used as the positive electrode in a non-aqueous electrolyte system. Different from the capacitive electrode, the air electrode generally contains a porous air diffusion layer for the catalyst to be air accessible. A hydrophobic porous layer could be made to prevent water/moisture from entering the device and polar solvent including water from leaving the device. The device's performance will deteriorate rapidly if the hydrophobic porous layer does not function well. The catalyst layer may deposit on top of the hydrophobic air diffusion layer. Catalysts may include metals, metal oxides, functionalized carbon materials (nitrogen-doped carbon fibers for example), and metal sulfides. Since high surface area is preferred to achieve high reactivity, a catalyst is generally deposited onto carbonaceous materials with high surface areas. A bifunctional catalyst may be a mixture of catalytic reactive materials for oxygen evolution and reduction reactions.

The asymmetric device concept can be applied to a variety of specific systems based on the difference in electrolyte property. Five examples are shown in FIGS. 3, 4, 5, 6, and 7. In all systems, the capacitive electrode may comprise a capacitive material, a binder, and a conductive additive. The binder can be organic or inorganic. The conductive additive can be any substance with good electric conductivity. Specifically, the conductive additive may be selected from carbon black, acetylene black, ketjen black, activated carbon, carbon nanowires, carbon nanotubes, graphite, graphene, and metal particles including copper, silver, nickel, titanium, aluminum, and conducting polymers. The capacitive material may be selected from an electro-inert material, an electro-active material, and their mixtures. The electro-inert material may be selected from amorphous, semi-crystalline, or crystalline carbonaceous materials. The semi-crystalline carbonaceous material may comprise crystallinity in the range of 1% to 99%, <1%, and >99%. The carbonaceous material may include activated carbons, carbon fibers, multi-wall carbon nanotubes, double-wall carbon nanotubes, single-wall carbon nanotubes, graphene, carbon nanocrystals, carbon nanoparticles, microporous carbons (pore size <2 nm), mesoporous carbons (pore size 2 nm-50 nm), macroporous carbons (pore size >50 nm), carbon nanocages, carbon nano-onions, carbon black, and fluorinated carbons. The electro-active material may be selected from any material that does not dissolve as ions during the cycling. The selection of a capacitive material will rely on its reactivity and stability in a specific electrolyte system. Composites of electro-inert materials and electro-active materials may be used to improve the cycling stability of the electro-active materials. The air catalyst may comprise any oxygen reduction catalyst and oxygen evolution catalyst that has been studied for fuel cells and metal-air batteries. A bifunctional catalyst that can catalyze both oxygen reduction and oxygen evolution may also be used. An oxygen reduction catalyst may serve as a bifunctional catalyst with $MnO_2$ as one example. These oxygen reduction and bifunctional catalysts may include but not limited to metals (Au, Ag, Pt, and their alloys), pyrolyzed metal porphyins (for example: iron tetra-methoxylphenyl porphyrin, cobalt tetraphenyl porphyrin), metal oxides (spinel $Mn_xCo_{3-x}O_4$, $Bi_2Ir_2O_{7-z}$, $Pb_2Ru_2O_{6.5}$, $MnO_2$, $LaMnO_3$, $CaMn_4O_x$, $La_{0.1}Ca_{0.9}MnO_3$, $LaCoO_3$, $LaNiO_3$, $LaCoSrO_3$, $La_{0.6}Ca_{0.4}CoO_3$, Nd(or La)$_{0.5}Sr_{0.5}CoO_3$, $La_{1-x}A_xFe_{1-y}Mn_yO_3$ (A=Sr, Ca), $La_{0.6}Ca_{0.4}Co_{0.8}B_{0.2}O_3$ (B=Mn, Fe, Co, Ni, or Cu), $La_{0.6}Ca_{0.4}CoO_{3-x}$, $La_{0.7}Ca_{0.3}CoO_{3-x}$, pyrochlore-based catalysts ($A_2B_2O_6O'$, A: Pb; B: Ru, Ir), metal hydroxides (NiOOH, $Co(OH)_2$, FeOOH), metal nitrides ($Mn_4N$), and functionalized carbons (nitrogen-doped carbonaceous materials). The oxygen evolution reaction catalyst may be selected from metals (Ni, Co, Ag, inter-metallic alloys (often containing significant amounts of Ni, Co or Fe)), metal oxides (spinels (particularly nickelites, cobaltites, and ferrites), perovskites, $IrO_2$, $RuO_2$, $FeWO_4$, $LaNiO_3$), metal sulfides (NiS), metal carbides (WC), and metal phosphates (cobalt phosphate). The selection of an air catalyst will depend on its reactivity and stability in a specific electrolyte.

For the rechargeable device, the electrolyte can be liquid, semi-solid, and solid. Electrolytes developed for batteries and supercapacitors can be used in this device. The basic requirement for a good electrolyte is that it can provide ions for energy storage. Based on this requirement, a variety of electrolytes could be used. Suitable electrolytes include but are not limited to aqueous alkaline solutions, aqueous acidic solutions, aqueous neutral solutions, organic solutions, ionic liquids, gels, polymers, and inorganic solids. The choice of an electrolyte will rely on the requirement for the performance of the device since the working mechanism of the device will be determined by the electrolyte.

For the rechargeable device, the current collector can be selected from Ni, Ti, Fe, Al, Cu, conductive carbons, conductive oxides, and conductive polymers.

For all systems, oxygen will be introduced as a reactant. Oxygen can be introduced by a variety of methods. Oxygen can be fed into the system from air or a pure oxygen source. Oxygen may be provided from the electrolyte solution as molecular oxygen. Either a closed-loop or open system may be used for oxygen circulation.

Figure 3:
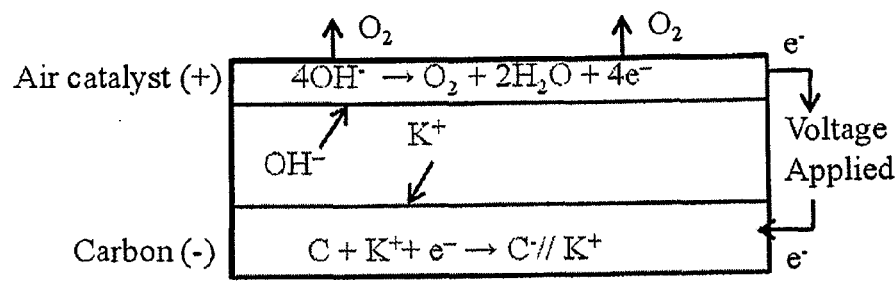
FIG. 3 is a schematic representation of electrochemical processes for an asymmetric rechargeable energy storage device and the corresponding movement of ions during charging and discharging in an alkaline aqueous electrolyte.
Figure 3:
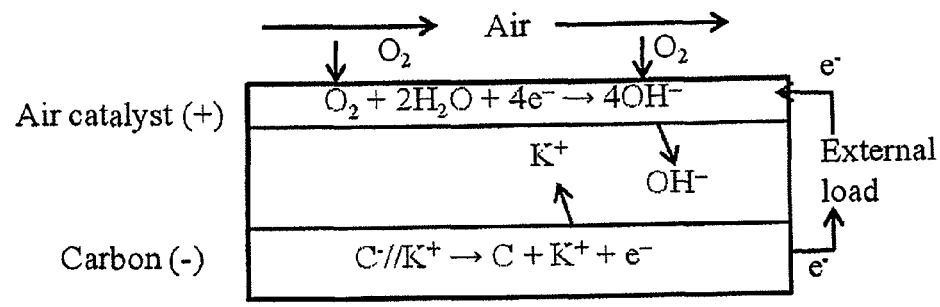

FIG. 3 shows an asymmetric rechargeable energy storage device with alkaline solution as the electrolyte. The alkaline solution can be made by dissolving an alkaline metal hydroxide including LiOH, NaOH, and KOH in water. During charging, the air electrode catalyzes the oxygen evolution reaction by decomposing hydroxide ions to produce oxygen gas. Meanwhile, alkaline metal cations such as potassium, sodium, and lithium ions will move to the negative electrode through the electrostatic attractions. During discharging, oxygen is reduced at the air electrode while the absorbed cations are released back into the electrolyte.

In an alkaline asymmetric energy storage device, the oxygen reduction reaction catalyst may be selected from Ag, pyrolyzed FeTMPP (iron tetra-methoxylphenyl porphyrine), $Mn_4N$, spinel $Mn_xCo_{3-x}O_4$, $Pb_2Ru_2O_{65}$, $MnO_2$, $LaMnO_3$, $La_{0.1}Ca_{0.9}MnO_3$, $LaCoO_3$, $LaNiO_3$, $LaCoSrO_3$, $La_{0.6}Ca_{0.4}CoO_3$, Nd(or La)$_{0.5}Sr_{0.5}CoO_3$, pyrochlore-based catalysts ($A_2B_2O_6O'$, A: Pb; B: Ru, Ir), NiOOH, $Co(OH)_2$, and FeOOH. The oxygen evolution reaction catalyst may be selected from Ni, Co, Ag, inter-metallic alloys (often containing significant amounts of Ni, Co or Fe), mixed oxides including spinels (particularly nickelites, cobaltites, and ferrites), perovskites, $IrO_2$, $RuO_2$, $FeWO_4$, NiS, WC, $LaNiO_3$, and cobalt phosphate. Bifunctional catalysts may comprise both oxygen reduction catalysts and oxygen evolution catalysts in certain ratios.

Different from the current metal-air batteries with using pure metals as the negative electrode materials, suitable negative electrode materials in this system may contain carbonaceous materials, uranates, lithium titanium phosphate, organic-inorganic compounds, polyoxometalates, and conducting polymers including polyaniline.

Figure 4:
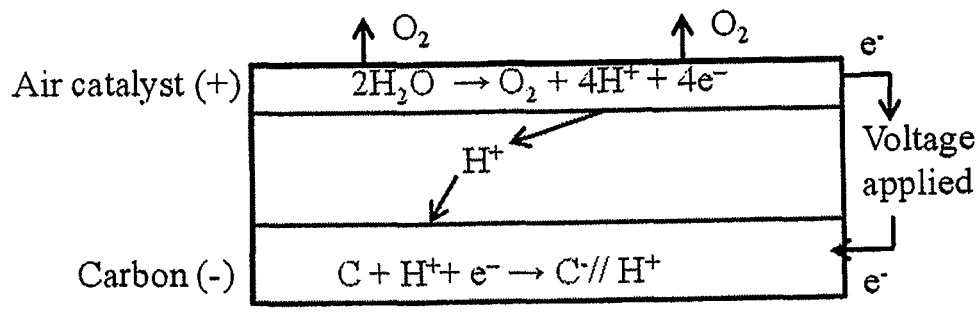
FIG. 4 is a schematic representation of electrochemical processes for an asymmetric rechargeable energy storage device and the corresponding movement of ions during charging and discharging in an acidic aqueous electrolyte.
Figure 4:
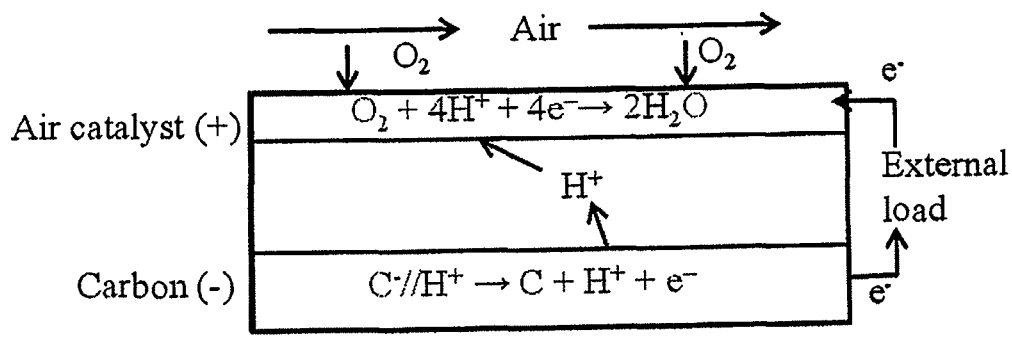

FIG. 4 shows the operation mechanism of an asymmetric rechargeable energy device with an acidic electrolyte. The electrolyte can be selected from $H_2SO_4$ and $H_3PO_4$. During charging, the air electrode catalyzes the oxygen evolution reaction by decomposing water to produce oxygen gas. Meanwhile, positive charged proton ions will move to the negative electrode to be adsorbed/stored at the capacitive electrode. During discharging, the air electrode reduces oxygen back into water and the adsorbed/stored proton ions are released back into the solution.

For the acidic asymmetric energy storage device, the capacitive material may be selected from carbonaceous materials and electro-active materials that are stable in acid solutions. These materials may comprise conductive polymers (polyanilion and polypyrrole), Pb, $TiO_2$, $Mo_xN$ (x=1 and 2), $MoO_3$, $WO_3$, $RuO_2$, polyoxometalates, and silicon.

Suitable oxygen reduction catalysts may include pyrolyzed transition metal phthalocyanin (iron, cobalt), Pt, Pd, CoPd, CoPt. Oxygen evolution catalysts may include $SnO_2$, $RuO_2$, and IrO.

Figure 5:
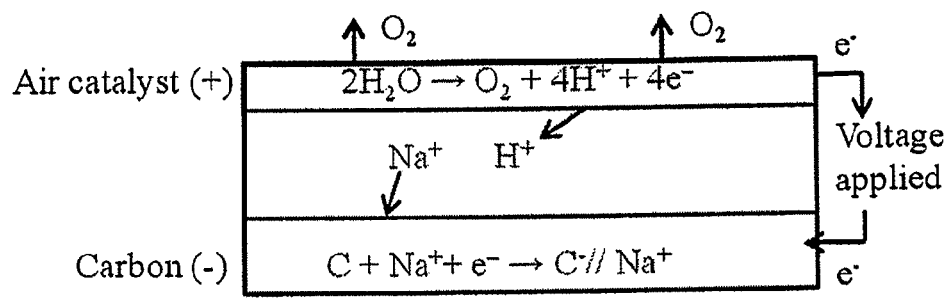
FIG. 5 is a schematic representation of electrochemical processes for an asymmetric rechargeable energy storage device and the corresponding movement of ions during charging and discharging in a neutral aqueous electrolyte.
Figure 5:
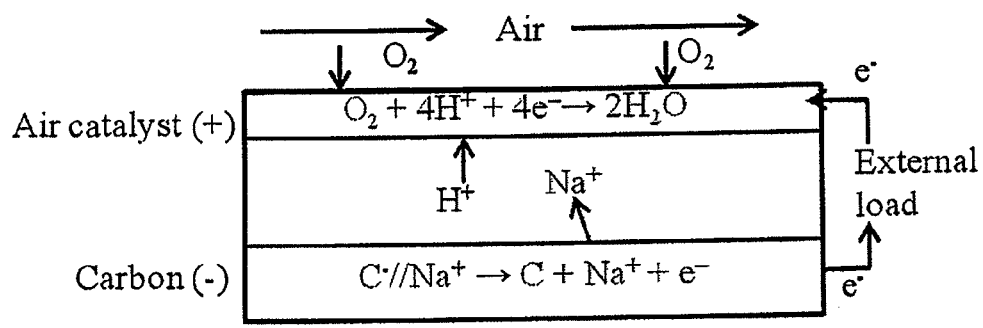

FIG. 5 shows the expected operation mechanism of an asymmetric rechargeable energy device with a neutral electrolyte. The electrolyte can be made by dissolving a salt or salts in water. Suitable salts include, but are not limited to, $A_xB_y$ (A: ammonium, lithium, sodium, potassium, magnesium, calcium, aluminum; B: $NO_3^-$, $Cl^-$, $SO_4^{2-}$, $PO_4^{3-}$, $BO_3^-$). The electrolyte solution may be weakly basic or acidic. During charging, the positive charged metal and proton ions move to the negative electrode, while water is decomposed to release oxygen at the air electrode. During discharging, $O_2$ is reduced at the air electrode, while adsorbed metal cations are released back into the electrolyte.

Suitable aqueous neutral electrolytes include aqueous solutions of carbonates of alkaline metals, chlorides of alkaline metals, sulfates of alkaline metals, borates of alkaline metals, phosphates of alkaline metals, ammonium salts, or their mixtures.

Suitable negative electrode materials for neutral solution may comprise amorphous, semi-crystalline, and crystalline carbonaceous materials, conducting polymers, polyoxometalates, lithium intercalated materials such as lithium titanium phosphate and lithium vanadium oxides, tin oxide, molybdenum oxide, indium oxide, and bismuth oxide.

Suitable oxygen reduction catalysts may comprise pyrolyzed transition metal phthalocyanines, transition metal tetramethoxyphenylporphyrin (TMPP), and $MnO_2$. Suitable oxygen evolution catalysts may include but not limited to metal oxide (mainly $MnO_2$), transition metal mixed oxides with spinellic structure ($AB_2O_4$, where A=a bivalent and B=a trivalent metal ion), transition metal mixed oxides with perovskite ($ABO_3$, where A=mainly La and B=Co or Ni) structure.

Figure 6:
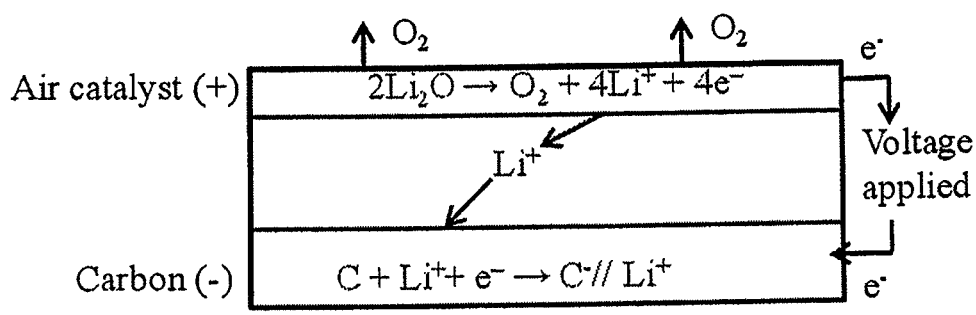
FIG. 6 is a schematic representation of electrochemical processes for an asymmetric rechargeable energy storage device and the corresponding movement of ions during charging and discharging in an organic electrolyte.
Figure 6:
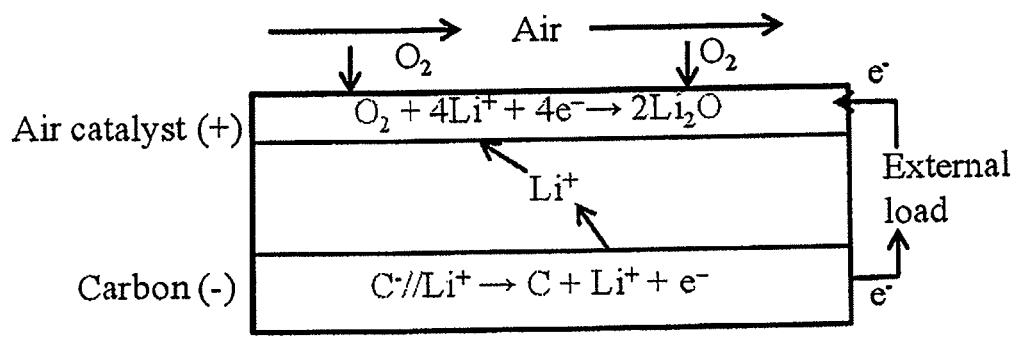

FIG. 6 shows the expected operation mechanism of an asymmetric rechargeable energy device with an organic electrolyte. A metal-containing salt such as $LiPF_6$ is used only for illustration purposes. During charging, the positive charged lithium ions move to the negative electrode, while lithium oxide is decomposed to release oxygen and lithium ions at the air electrode. During discharging, $O_2$ is reduced at the air electrode to form lithium oxide, while adsorbed lithium cations are released back into the electrolyte.

Organic solvents, ionic liquids, polymer gels, polymers, solid ionic conductors, and salts used for lithium-ion batteries and supercapacitors can be used for this device. Suitable salts may include alkaline metals, alkaline earth metals, and any other metal or organic group that can form ions in the electrolyte. Typical salts containing lithium include $LiClO_4$, $LiPF_6$, $LiBF_4$, $LiAsF_6$, $LiC(SO_2CF_3)_3$, $LiN(SO_2CF_3)_2$, $LiSO_3CF_3$, LiBr, lithium bis(oxatlato)borate (LiBOB), and LiI. Polymer electrolytes may include poly(ethylene oxide) (PEO), poly(propylene oxide) (PPO), poly(acrylonitrile) (PAN), poly(methyl methacrylate) (PMMA), poly(vinyl chloride) (PVC), poly(vinyliden fluoride) (PVdF). Solid inorganic ionic conductors include but not limited to LiX (X: F, Cl, Br, I), $LiAlCl_4$, $Li_3N$, $Li_3PO_4$, $Li_4WiO_4$, $LiTi_2(PO_4)_3$, $Li_3(PO_{4-x})N_x$ (LiPON), inorganic materials occupying perovskite-, NASICON- and $Li_4SiO_4$-type crystal structures.

Suitable negative electrode material may comprise partially or fully electro-inert amorphous carbons, semi-crystalline carbons, crystalline carbons that are charged/discharged to above a certain potential level (1.0 V vs. $Li/Li^+$, 0.5 V vs. $Li/Li^+$ or 0.3 V vs. $Li/Li^+$ for example). In another case, the negative electrode material may be a composite containing an electro-active carbonaceous material and a non-carbon element (silicon, tin, germanium, arsenic, antimony, tellurium, or boron). The electro-active carbonaceous material is to help release the expansion/contraction stress of the non-carbon material during the charge/discharge process, while the electro-active non-carbon material provides the high energy storage capacity through faradic reactions. For the carbonaceous material to work efficiently, the composite is preferred to be made in a way that most of the non-carbon electro-active particles are in contact with carbon particles. As one example, each of the non-carbon particles can be covered with a continuous carbon coating similar to a core-shell structure. As another example, at least one non-carbon particles may be dispersed in a carbon matrix. As a third example, non-carbon particles may be coated on the surface of carbonaceous materials including but not limited to carbon nanofibers, carbon nanotubes, and graphene. The composite in this invention is not preferred to be made by simply mixing at least two components mechanically unless aggregates of non-carbon particles can be broken into smaller aggregates in nano sizes (<100 nm preferred). As a forth example, the non-carbon active material may be covered a mechanically flexible conductive polymer. The conductive polymer constrains the volume expansion/contraction of the non-carbon particles to increase their cycling stability.

Suitable negative electrode material may comprise a composite made from a carbonaceous material and an element. The element may be a metal selected from alkaline earth metals, transition metals, Al, Ga, In, Sn, Pb, and Bi. To ensure the cycling stability of the negative composite material, the element can not be dissolved during the charge process. For example, in lithium-ion electrolyte, metallic lithium can not be used. In another example, metallic Mg can not be used when $Mg^{2+}$ is the active ion in the electrolyte for energy storage. The element may be a semimetals selected from B, Si, Ge, As, and Sb. To ensure the cycling stability, a carbonaceous material such as carbon nanotubes and graphene has to be incorporated to release the volume expansion/contraction of the elemental material during the cycling process.

Suitable negative electrode material may comprise a compound including but not limited to lithium titanium oxide, transition metal oxides (iron oxide, molybdenum oxide, manganese oxide, cobalt oxide, molybdenum oxide, manganese oxide, vanadium oxide, nickel oxide, $RuO_2$, titanium oxide), tin oxide, antimony oxide, lead oxide, bismuth oxide, metal sulfides ($TiS_2$, $MoS_2$, $FeS_2$, FeS, $TaS_2$), metal selenides (MnSe, ZnSe, SnSe, $Sb_2Se_3$, and $Mo_6Se_6$), metal nitrides ($Li_7MnN_4$, $Li_3FeN_2$, $Li_{2.6}Co_{0.4}N$, $Li_{2.7}Fe_{0.3}N$), metal phosphides ($MnP_4$, $FeP_2$, $Li_7MP_4$ (M=Ti, V, Mn), $CoP_3$), metal borates ($FeBO_3$, $VBO_3$, for example), metal sulfates, polyoxometalates, conducting polymers, and their mixtures.

Air electrode materials developed for rechargeable lithium-air batteries can be used in this system. Suitable oxygen reduction catalysts may comprise carbonaceous materials, $MnO_x$ and transition metal phthalocyanine (transition metal: Fe, Co). Suitable oxygen evolution catalysts may include nickel foam. Other catalysts that have been developed for aqueous systems (fuel cells, metal-air batteries) may be useful for the organic hybrid energy storage device as well.

Figure 7:
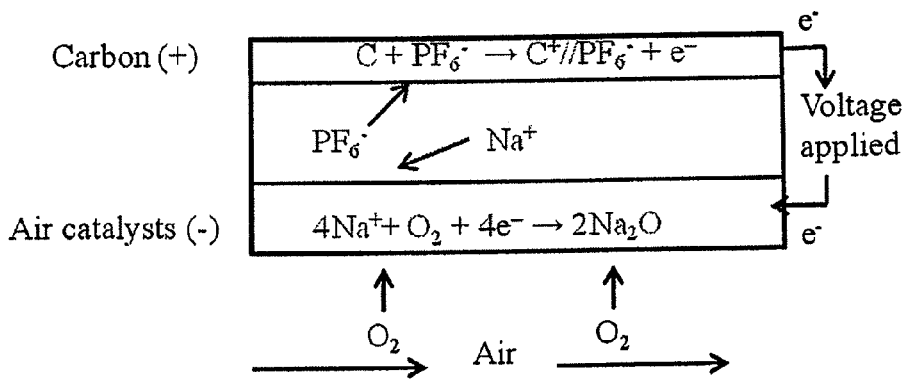
FIG. 7 is a schematic representation of electrochemical processes for an asymmetric rechargeable energy storage device with the air electrode as the negative electrode and the corresponding movement of ions during charging and discharging in an organic electrolyte.
Figure 7:
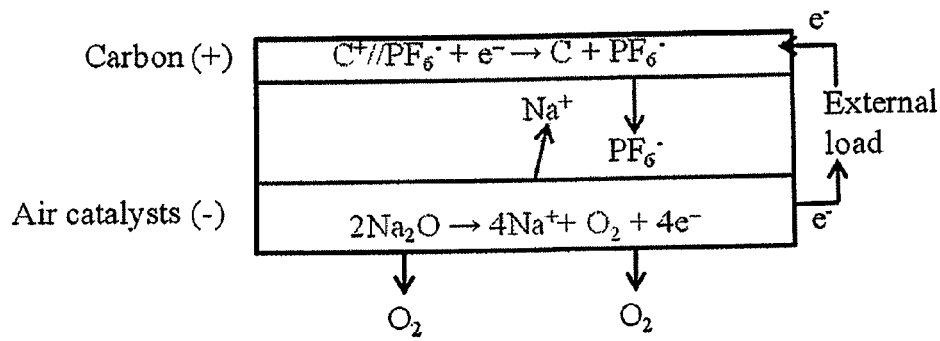

Without being bound by any particular theory, FIG. 7 shows the expected operation mechanism for a rechargeable energy storage device with the air electrode acting as a negative electrode. $NaPF_6$ is used as the salt for illustration purposes. The reason to choose $NaPF_6$ is that the theoretical redox potential for the air electrode with $Na^+$ salt is 1.94 V vs. $Li/Li^+$, which is suitable for a negative electrode. During charging, the positive charged sodium ions move to the negative electrode, where they combine with the reduced $O_2$ to form sodium oxide. The negative charged $PF_6^-$ ions are attracted to the positive electrode to be adsorbed at the surface of carbon materials. During discharging, sodium oxide is oxidized at the air electrode to release sodium ions and oxygen, while adsorbed $PF_6^-$ anions are released back into the electrolyte.

Organic solvents, ionic liquids, polymer gels, polymers, solid ionic conductors, and salts used for lithium-ion batteries and supercapacitors can be used for this device. Suitable salts may include alkaline metals, alkaline earth metals, and any other metal (for example Zn and Al) or organic group that can form ions in the electrolyte. Polymer electrolytes may include poly(ethylene oxide) (PEO), poly(propylene oxide) (PPO), poly(acrylonitrile) (PAN), poly(methyl methacrylate) (PMMA), poly(vinyl chloride) (PVC), poly(vinyliden fluoride) (PVdF). Solid inorganic ionic conductors include but not limited to LiX (X: F, Cl, Br, I), $LiAlCl_4$, $Li_3N$, $Li_3PO4$, $Li_4WiO_4$, $LiTi_2(PO_4)_3$, $Li_3(PO_{4-x})N_x$ (LiPON).

Developed cathode materials for lithium ion batteries are suitable capacitive materials for the device. These materials may comprise but not limited to inorganic materials with layered, spinel, perovskite structures, carbons, and organic materials. Any material that can provide high redox potentials (preferably >2 V vs. $Li/Li^+$) can be used as the positive electrode material. Capacitive material may comprise but not limited to carbonaceous materials, fluorinated carbonaceous materials, metal oxides ($LiCoO_2$, $LiNiO_2$, $LiMn_2O_4$, $V_2O_5$, $V_6O_{13}$, $LiV_3O_8$, and their mixtures), metal phosphates ($LiTi_2(PO_4)_3$, $LiFePO_4$, $LiMnPO_4$, $LiNiPO_4$, $LiCoPO_4$, $VOPO_4$, $Li_4P_2O_7$, $LiVPO_4$, $Li_3V_2(PO_4)_3$), metal fluorides ($LiVPO_4F$, fluorine-doped oxides), metal sulfates ($Fe_2(SO_4)_3$, $Mn_2(SO_4)_3$), metal borates ($LiFeBO_3$, $LiMnBO_3$, $LiNiBO_3$, $LiCoBO_3$), metal vanadates (metal: Co, Fe, Zn, Ni, Cu, Mg), bromine, iodine, sulfur, selenium, and their mixtures.

Air electrode materials developed for fuel cells, rechargeable lithium-air batteries, and rechargeable zinc-air batteries can be used in this system.

EXAMPLES

Figure 8:
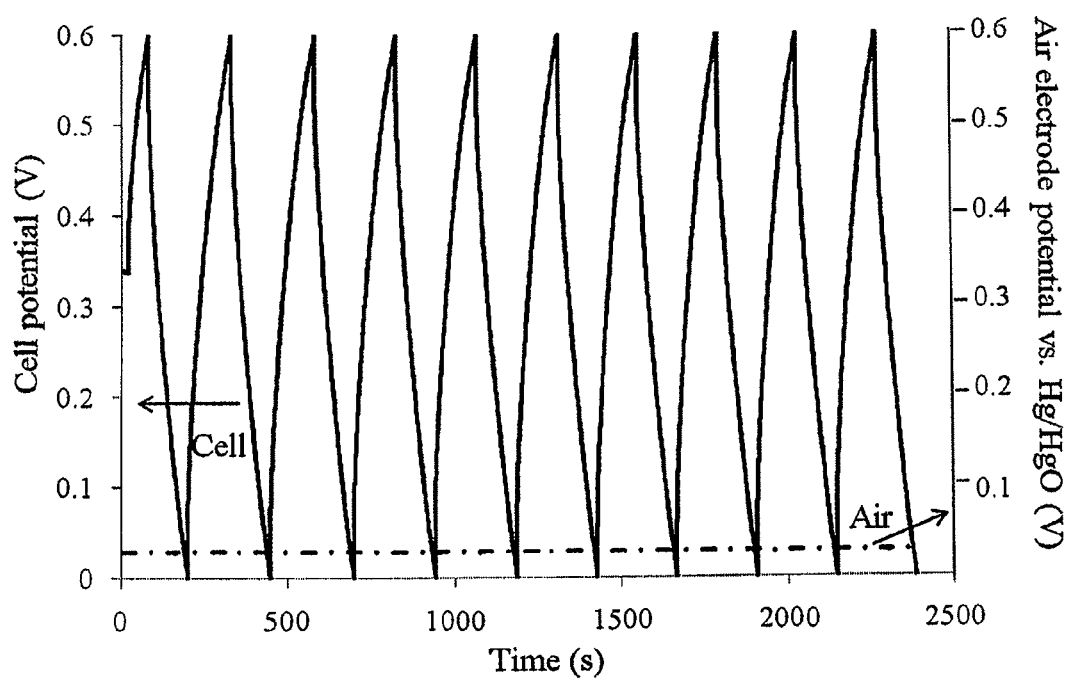
FIG. 8 is a plot illustrating time evolution of cell and air electrode potentials during constant current charge/discharge cycling.

A two-electrode test cell of the asymmetric energy storage device was fabricated by using an air electrode from a commercial zinc-air battery as the positive electrode and an activated carbon capacitive electrode as the negative electrode. A mercury-mercuric oxide (Hg/HgO) reference electrode was added into the cell to monitor the potential evolution of the air electrode during charge and discharge cycles. The air electrode was obtained by dissembling a commercial zinc-air button cell and then rinsing the electrode with de-ionized water. 1 M KOH was used as the electrolyte for the test cell. Electrochemical testing was carried out in a battery testing instrument (ARBIN). A graph of constant current charge/discharge curves is shown in FIG. 8. The charge/discharge curves are almost linear, which is typical for double-layer capacitance (non-faradic reactions). The cell is stable for the tested cycles. No visually observable decrease in charging/discharge time is observed. The air electrode potential during the charge/discharge cycles keeps constant, confirming that the air electrode acts as a catalyst instead of a capacitive electrode. Otherwise, the potential at the air electrode would increase during charging and decrease during discharging. The experiment shows that a stable asymmetric rechargeable energy storage device can be made from an air electrode and a stable capacitive material.

Thus, the inventors have disclosed an invention wherein at least one embodiment includes a rechargeable energy storage device comprising an air electrode where oxygen reduction and evolution takes place, a capacitive electrode where a non-faradic reaction contributes to at least about 5% of the total specific capacity, an ion-permeable separator, and an electrolyte. For the capacitive electrode, the non-faradic reaction may contribute to at least about 20% of the total specific capacity. It is also possible that the non-faradic reaction may contribute to at least about 50% or 90% of the total specific capacity.

The air electrode may be used as the positive electrode while the capacitive electrode is the negative electrode similar to the prior art metal-air batteries. The air electrode may also be used as the negative electrode while the capacitive electrode is used as the positive electrode.

The air electrode may have a porous hydrophobic layer to let air in and out, while restricts the egression of solvent from the device and the ingression of moisture from air.

The air electrode may be fabricated in a way that two electrodes will be used to carry out oxygen reduction and evolution separately.

The air electrode may have at least one catalyst that can catalyze oxygen reduction and evolution.

The oxygen reduction catalyst may be selected from metals, metal oxides, pyrolyzed metal porphyrins, metal nitrides, metal hydroxides, and functionalized carbons.

The metals may comprise Ag, Pt, Au, and their alloys.

The metal oxides may comprise spinel $Mn_xCo_{3-x}O_4$, $Bi_2Ir_2O_{7-z}$, $Pb_2Ru_2O_{6.5}$, $MnO_2$, $LaMnO_3$, $CaMn_4O_x$, $La_{0.1}Ca_{0.9}MnO_3$, $LaCoO_3$, $LaNiO_3$, $LaCoSrO_3$, $La_{0.6}Ca_{0.4}CoO_3$, Nd(or $La)_{0.5}Sr_{0.5}CoO_3$, $La_{1-x}A_xFe_{1-y}M-n_yO_3$ (A=Sr, Ca), $La_{0.6}Ca_{0.4}Co_{0.8}B_{0.2}O_3$ (B=Mn, Fe, Co, Ni, or Cu), $La_{0.6}Ca_{0.4}CoO_{3-x}$, $La_{0.7}Ca_{0.3}CoO_{3-x}$, pyrochlore-based catalysts ($A_2B_2O_6O'$, A: Pb; B: Ru, Ir).

The pyrolyzed metal porphyins may comprise iron tetramethoxylphenyl porphyrin and cobalt tetraphenyl porphyrin.

The metal nitrides may comprise $Mn_4N$.

The metal hydroxides may comprise NiOOH, $Co(OH)_2$, and FeOOH.

The functionalized carbons may comprise nitrogen-doped carbonaceous materials.

The oxygen evolution catalyst may be selected from metals, metal oxides, metal sulfides, metal carbides, and metal phosphates.

The metals may comprise Ni, Co, Ag, and inter-metallic alloys (often containing significant amounts of Ni, Co or Fe).

The metal oxides may comprise spinels (particularly nickelites, cobaltites, and ferrites), perovskites, $IrO_2$, $RuO_2$, $FeWO_4$, $LaNiO_3$.

The metal sulfides may comprise NiS.

The metal carbides may comprise WC.

The metal phosphates may comprise cobalt phosphate.

The bi-functional oxygen reduction and evolution catalyst may be selected from the group comprising metals, pyrolyzed metal porphyins, metal oxides, metal hydroxides, metal nitrides, and functionalized carbons.

The metals may comprise Ag, Pt, Au, and their alloys.

The pyrolyzed metal porphyins may comprise iron tetramethoxylphenyl porphyrin, cobalt tetraphenyl porphyrin.

The metal oxides may comprise spinel $Mn_xCo_{3-x}O_4$, $Bi_2Ir_2O_{7-z}$, $Pb_2Ru_2O_{6.5}$, $MnO_2$, $LaMnO_3$, $CaMn_4O_x$, $La_{0.1}Ca_{0.9}MnO_3$, $LaCoO_3$, $LaNiO_3$, $LaCoSrO_3$, $La_{0.6}Ca_{0.4}CoO_3$, Nd(or $La)_{0.5}Sr_{0.5}CoO_3$, $La_{1-x}A_xFe_{1-y}M_nyO_3$ (A=Sr, Ca), $La_{0.6}Ca_{0.4}Co_{0.8}B_{0.2}O_3$ (B=Mn, Fe, Co, Ni, or Cu), $La_{0.6}Ca_{0.4}CoO_{3-x}$, $La_{0.7}Ca_{0.3}CoO_{3-x}$, pyrochlore-based catalysts ($A_2B_2O_6O'$, A: Pb; B: Ru, Ir).

The metal hydroxides may comprise NiOOH, $Co(OH)_2$, and FeOOH.

The metal nitrides may comprise $Mn_4N$.

The functionalized carbons may comprise nitrogen-doped carbonaceous materials.

The current collector may be selected from metals, conductive carbons, conductive oxides, and conductive polymers.

The metals may comprise Ni, Ti, Fe, Al, and Cu.

The capacitive electrode may comprise at least one material selected from electro-inert materials.

The electro-inert material may be selected from activated carbons, porous carbons, carbon foams, carbon fibers, carbon nanotubes, graphene, and carbon nanoparticles, which provide a non-faradic reaction.

The capacitive electrode may comprise an electro-active material.

The electro-active material may be selected from metals that can form alloys with the active metal cations from the electrolyte, semimetals, nonmetals, metal oxides, metal borates, metal sulfides, metal selenides, metal phosphides, metal nitrides, fluorinated carbons, metal phosphates, metal fluorides, metal sulfates, metal borates, metal vanadates, polyoxometalates, conductive polymers, and their mixtures, which provide a faradic reaction.

The capacitive material may be a mixture or composite of at least one electro-inert material and at least one electro-active material.

The electrolyte may be an aqueous solution containing acid, base, salt, and their mixtures.

The base may comprise LiOH, NaOH, and KOH;

The acid may comprise $H_2SO_4$ and $H_3PO_4$.

The salt may comprise $A_xB_y$ (A: ammonium, lithium, sodium, potassium, magnesium, calcium, aluminum; B: $NO_3^-$, $Cl^-$, $SO_4^{2-}$, $Po_4^{3-}$, $BP_3^-$).

The electrolyte may be a non-aqueous solution.

The non-aqueous solution may be an organic solvent, a polymer, a polymer gel, an ionic liquid, an ion-conductive solid.

The organic solvent may contain ethylene carbonate, diethyl carbonate, propylene carbonate, and acetonitrile.

The ion-conductive solid may be selected from lithium titanium phosphate and materials occupying perovskite-, NASICON- and $Li_4SiO_4$-type crystal structures.

In one embodiment, the rechargeable energy storage device has one negative air electrode, a positive capacitive electrode, an ion-permeable separator, and a non-aqueous electrolyte.

The positive capacitive electrode contains at least one material for charge storage.

The capacitive material may be selected from carbonaceous materials, fluorinated carbons, sulfur, selenium, iodine, bromine, carbonaceous materials, metal fluorides, metal oxides, metal sulfates, metal phosphates, metal borates, metal vanadates, and their mixtures.

Metal fluorides may contain fluorine-doped metal oxides and $LiVPO_4F$.

Metal oxides may comprise $LiCoO_2$, $LiNiO_2$, $LiMn_2O_4$, and their mixtures.

Metal sulfates may comprise $Fe_2(SO_4)_3$ and $Mn_2(SO_4)_3$.

Metal phosphates may comprise $LiTi_2(PO_4)_3$, $LiFePO_4$, $LiMnPO_4$, $LiNiPO_4$, $LiCoPO_4$, $VOPO_4$, $Li_4P_2O_7$, $LiVPO_4$, and $Li_3V_2(PO_4)_3$.

Metal borates may comprise $LiFeBO_3$, $LiMnBO_3$, $LiNiBO_3$, $LiCoBO_3$, and their mixtures.

Metal vanadates may comprise $Co_2V_2O_7$, $Ni_2V_2O_7$, $Fe_2V_2O_7$, $Mn_2V_2O_7$, $Zn_2V_2O_7$, $Cu_2V_2O_7$, and $Mg_2V_2O_7$.

In one embodiment, the rechargeable energy storage device has one positive air electrode, one negative capacitive electrode, an ion-permeable separator, and a non-aqueous electrolyte.

The capacitive electrode contains at least one composite material or compound.

The composite material may be selected from a carbonaceous material and a second material comprising semimetals and metals. These metals will not dissolve during the discharge process. For example, non-lithium metals will be used when the non-aqueous electrolyte contains a lithium salt. For electrolyte containing a lithium salt, the metals may be selected from alkaline earth metals, transition metals, Al, Ga, In, Sn, Pb, and Bi.

The semi-metals may be selected from B, Si, Ge, As, and Sb.

The compound may be selected from metal oxides, metal sulfides, metal selenides, metal phosphides, metal borates, and metal nitrides.

Metal oxides may comprise lithium titanium oxide, transition metal oxides (iron oxide, molybdenum oxide, manganese oxide, cobalt oxide, molybdenum oxide, manganese oxide, vanadium oxide, nickel oxide, $RuO_2$, titanium oxide), tin oxide, antimony oxide, lead oxide, and bismuth oxide.

Metal sulfides may comprise $TiS_2$, $MoS_2$, $FeS_2$, FeS, and $TaS_2$.

Metal selenides may comprise MnSe, ZnSe, SnSe, $Sb_2Se_3$, and $Mo_6Se_6$.

Metal phosphides may comprise $MnP_4$, $FeP_2$, $Li_7MP_4$ (M=Ti, V, Mn), $CoP_3$.

Metal borates may comprise $FeBO_3$ and $VBO_3$.

Metal nitrides may comprise $Li_7MnN_4$, $Li_3FeN_2$, $Li_{2.6}Co_{0.4}N$, and $Li_{2.7}Fe_{0.3}N$.

Thus, while only certain embodiments have been specifically described herein, it will be apparent that numerous modifications may be made thereto without departing from the spirit and scope of the invention. It is a goal of the invention to achieve one or more objects of the invention, although the invention may be practiced without the full achievement of any one of these objects. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A hybrid rechargeable energy storage device comprising:
   an air electrode, wherein an electrochemical process comprising reduction and evolution of oxygen takes place;
   a capacitive electrode comprising a double layer electrochemical capacitor that stores energy through nonfaradic reaction;
   a separator which is ion-permeable; and
   an electrolyte containing ions for non-faradic and faradic reactions,
   wherein said capacitive electrode comprises at least one material selected from electro-inert materials comprising activated carbons, porous carbons, carbon foams, carbon fibers, carbon nanotubes, grapheme, and carbon nanoparticles, which is structured to provide a non-faradic reaction, and
   wherein a capacitive electrode process comprises a nonfaradic reaction which contributes to at least about 20% of the overall specific capacitance of the capacitive electrode.

2. The rechargeable energy storage device of claim 1, wherein the capacitive electrode process comprises a nonfaradic reaction which contributes to at least about 50% of the overall specific capacitance of said capacitive electrode.

3. The rechargeable energy storage device of claim 1, wherein the capacitive electrode process comprises a nonfaradic reaction which contributes to at least about 90% of the overall specific capacitance of said capacitive electrode.

4. The rechargeable energy storage device of claim 1, wherein said air electrode is the positive electrode and said capacitive electrode is the negative electrode of said rechargeable energy storage device.

5. The rechargeable energy storage device of claim 1, wherein said air electrode is the negative electrode and said capacitive electrode is the positive electrode of said rechargeable energy storage device.

6. The rechargeable energy storage device of claim 1, wherein said air electrode comprises a porous gas-diffusion layer, wherein ingress and egress of oxygen is achieved through the porous gas-diffusion layer.

7. The rechargeable energy storage device of claim 1, wherein said air electrode comprises two separated electrodes, wherein the reduction and evolution of oxygen are at individual separated electrodes.

8. The rechargeable energy storage device of claim 1, wherein said air electrode contains one or more catalysts enabling reduction and evolution of oxygen.

9. The rechargeable energy storage device of claim 1, wherein said air electrode comprises at least one catalyst selected from metals, pyrolyzed metal porphyrins, metal oxides, metal hydroxides, metal nitrides, and functionalized carbonaceous materials, for oxygen reduction.

10. The rechargeable energy storage device of claim 1, wherein said air electrode comprises at least one catalyst selected from metals, metal oxides, metal sulfides, metal carbides, and metal phosphates, for oxygen evolution.

11. The rechargeable energy storage device of claim 1, wherein said air electrode comprises at least one bi-functional catalyst selected from the group comprising metals, pyrolyzed metal porphyins, metal oxides, metal hydroxides, metal nitrides, and functionalized carbonaceous materials.

12. The rechargeable energy storage device of claim 1, wherein said air electrode comprises an electrically conductive current collector selected from metals, conductive carbons, conductive oxides, and conductive polymers.

13. The rechargeable energy storage device of claim 1, wherein said capacitive electrode comprises at least one material selected from electro-active materials, comprising metals that can form alloys with the metal cations from electrolyte during charging, semimetals, nonmetals, metal oxides, metal borates, metal sulfides, metal selenides, metal phosphides, metal nitrides, fluorinated carbons, metal phosphates, metal fluorides, metal sulfates, metal borates, metal vanadates, polyoxometalates, conductive polymers, and their mixtures, which provide a faradic reaction.

14. The rechargeable energy storage device of claim 1, wherein said capacitive electrode comprises a mixture or composite of at least one electro-inert electrode material providing a non-faradic reaction and at least one electro-active electrode material providing a faradic reaction.

15. The rechargeable energy storage device of claim 1, wherein said electrolyte comprises an aqueous solution containing acid, base, salt, or their mixtures.

16. The rechargeable energy storage device of claim 1, wherein said electrolyte comprises a nonaqueous electrolyte selected from organic solvents, polymer gels, polymers, ionic liquids, and ion-conductive solids.

17. The rechargeable energy storage device of claim 16, wherein said organic solvent comprises ethylene carbonate, diethyl carbonate, propylene carbonate, and acetonitrile.

18. The rechargeable energy storage device of claim 16, wherein said ion-conductive solid comprises lithium titanium phosphate and materials occupying perovskite-, NASICON- and $Li_4SiO_4$-type crystal structures.

19. A hybrid rechargeable energy storage device comprising:
   a negative air electrode comprising at least one catalyst for oxygen reduction and evolution;
   a positive capacitive electrode comprising a double layer electrochemical capacitor comprising at least one capacitive material for charge storage;
   an ion-permeable membrane; and
   a non-aqueous electrolyte containing ions for non-faradic and faradic reactions,
   wherein the positive capacitive electrode comprises at least one material selected from electro-inert materials comprising activated carbons, porous carbons, carbon foams, carbon fibers, carbon nanotubes, grapheme, and carbon nanoparticles, which is structured to provide a non-faradic reaction, and
   wherein a capacitive electrode process comprises a nonfaradic reaction which contributes to least about 20% of the overall specific capacitance of the capacitive electrode.

20. The rechargeable energy storage device of claim 19, wherein said capacitive material comprises at least one material selected from carbonaceous materials, fluorinated carbons, nonmetals, metal fluorides, metal oxides, metal phosphates, metal sulfates, metal borates, metal vanadates, and their mixtures.

21. A hybrid rechargeable energy storage device comprising:
   a positive air electrode comprising at least one catalyst for oxygen reduction and evolution;
   a negative capacitive electrode comprising a double layer electrochemical capacitor comprising at least an electro-active material consisting of a composite or compound;
   an ion permeable separator; and
   a non-aqueous electrolyte containing metal ions, wherein the negative capacitive electrode comprises at least one material selected from electro-inert materials comprising activated carbons, porous carbons, carbon foams, carbon fibers, carbon nanotubes, graphene, and carbon nanoparticles, which is structured to provide a non-faradic reaction, and wherein a capacitive electrode process comprises a nonfaradic reaction which contributes to at least about 20% of the overall specific capacitance of the capacitive electrode.

22. The rechargeable energy storage device of claim 21, wherein said electro-active material comprises a composite containing a carbonaceous material and a material selected from semimetals and metals that do not dissolve during discharging.

23. The rechargeable energy storage device of claim 21, wherein said electro-active material comprises a compound selected from metal oxides, metal sulfides, metal selenides, metal phosphides, metal borates, metal nitrides, and their mixtures.

24. The rechargeable energy storage device of claim 1, wherein said capacitive electrode comprises a current collector and a capacitance-active material coated on the current collector.

25. The rechargeable energy storage device of claim 24, wherein said capacitive electrode further comprises a conductive additive and a polymer binder.

26. The rechargeable energy storage device of claim 25, wherein said conductive additive is selected from carbon black, acetylene black, ketjen black, activated carbon, carbon nanowires, carbon nanotubes, graphite, graphene, and metal particles including copper, silver, nickel, titanium, aluminum, and conducting polymers.

* * * * *